J. W. APPLEGATE.
INDICATOR FOR TYPE CASTING MACHINES.
APPLICATION FILED DEC. 5, 1914.
1,160,359. Patented Nov. 16, 1915.
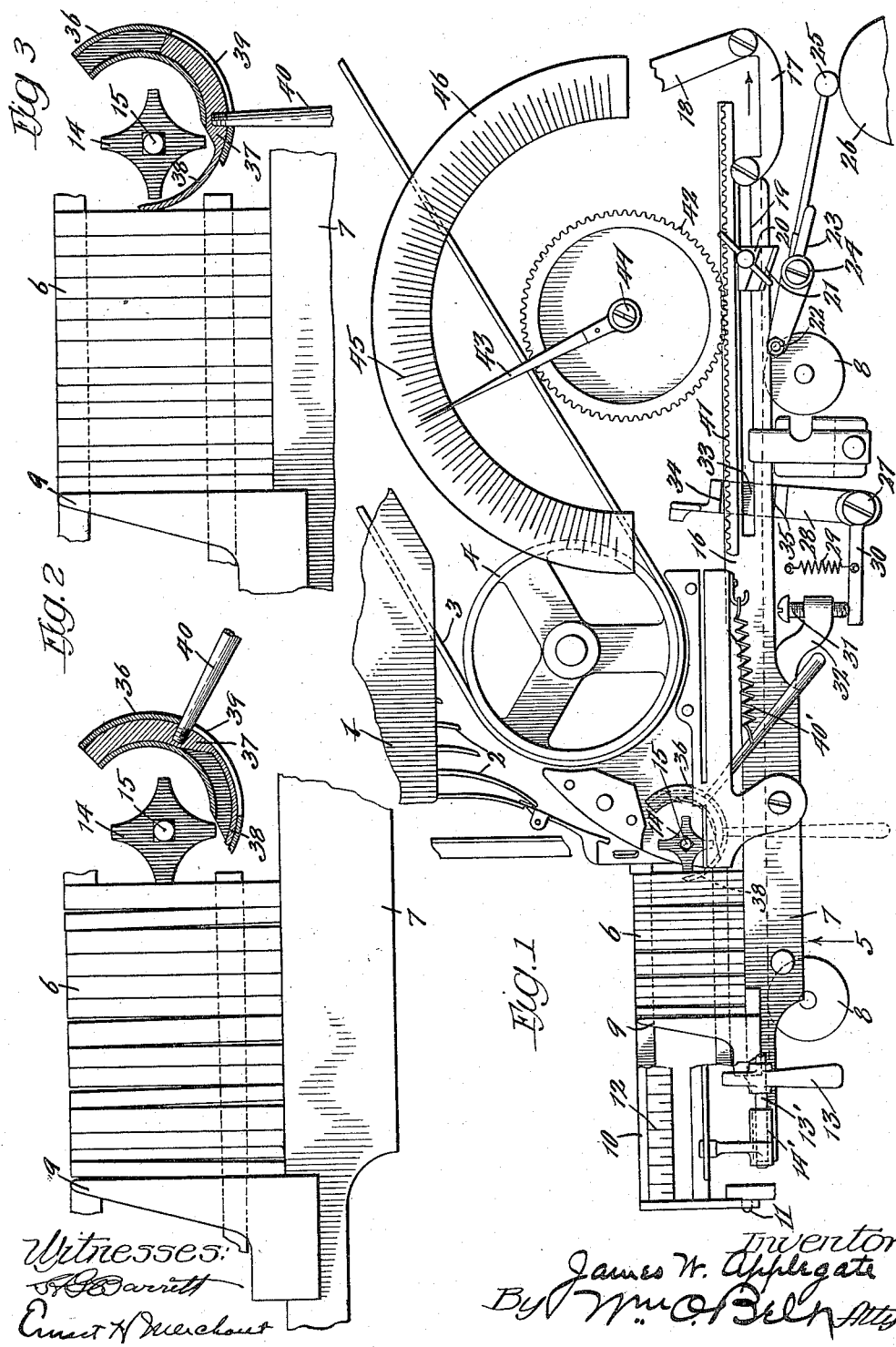

UNITED STATES PATENT OFFICE.

JAMES W. APPLEGATE, OF WESTERN SPRINGS, ILLINOIS, ASSIGNOR TO THE GUNTHORP-WARREN PRINTING COMPANY, OF CHICAGO, ILLINOIS, A CORPORATION OF ILLINOIS.

INDICATOR FOR TYPE-CASTING MACHINES.

1,160,359.  Specification of Letters Patent.  Patented Nov. 16, 1915.

Application filed December 5, 1914. Serial No. 875,592.

*To all whom it may concern:*

Be it known that I, JAMES W. APPLEGATE, a citizen of the United States, residing at Western Springs, in the county of Cook and State of Illinois, have invented certain new and useful Improvements in Indicators for Type-Casting Machines.

This invention relates in general to indicators for type casting machines and more particularly to a device which may be readily attached to a standard machine of this class and which will instantaneously and accurately indicate to the operator the number of ems of type corresponding to the matrices assembled on the stick.

Type casting machines are at present provided with a scale mounted adjacent the stick which roughly indicates the ems assembled on the stick but owing to the looseness with which the matrices are normally packed on the stick by the revolving star wheel and the fact that no fixed base is provided on the stick from which to calibrate the scale it gives only approximate results. In setting tabulated and similar work in which it is necessary to provide, in the finished column comprising a plurality of lines, for vertical alinement of a plurality of separate items cast in each single line, it has been necessary for the operator to remove each line of matrices from the stick and to separately justify the line with reference to a facsimile of the first line of the matter which he is setting. This, as will be readily understood, is a tedious operation which requires considerable time and markedly diminishes the efficiency of the operator.

It is the object of my invention to provide a simple means whereby the operator is enabled to read directly from an indicator the exact number of ems assembled on the stick so that he is able to properly justify the line without removing the matrices from the stick.

Other objects and advantages of my invention will be apparent as it is better understood by reference to the following specification in connection with the accompanying drawing in which—

Figure 1 is a front elevation showing a portion of a type-casting machine with my invention disposed thereon in operative position; Fig. 2 is a detail in elevation of the stick with a plurality of matrices assembled thereon and with the clamping device in normal position, and Fig. 3 is a similar view with the clamping device in measuring position.

Referring to the drawings, 1 indicates a magazine of a type casting machine having guides 2 for directing the matrices toward the assembly position.

3 indicates a belt, disposed about the pulley 4, adapted to be constantly moved and to serve as a conveyer for the matrices released from the magazine.

5 indicates generally the stick upon which the matrices 6 are assembled and comprises a base 7 slidably mounted on rollers 8, secured to the frame of the machine. An end block 9 is secured to the base 7 and acts as a support against which the matrices 6 are delivered. A front plate 10 is pivotally mounted to the frame at 11 and bears a scale 12 which roughly indicates the ems of matrices assembled in the stick. A handle 13 is secured to the shaft 13′ mounted in bearing 14′ and is adapted through suitable mechanism to raise the matrices to obtain an italic face. A star wheel 14 is suitably mounted on a shaft 15 which is rotated at a high rate of speed through suitable driving means (not shown).

The base 7 is provided with an extension 16 which, through links 17 and 18, is connected with resilient means (not shown) adapted to normally force the base 7 and the extension 16 in the direction indicated by the arrow in Fig. 1. Adjustably mounted in a slot 19 in the extension 16 is a bell tripping device 20 having a cam slot 21 adapted to coact with a roller 22 on a bell striking lever 23 pivoted at 24 and provided with a hammer 25 to coact with a bell 26 to indicate the end of the line. Pivoted to the frame of the machine at 27 is a brake lever 28 normally held in the position indicated in Fig. 1 by tension spring 29 secured to the frame of the machine and to an arm 30 of the brake lever 28. An adjustable stop 31 is mounted in an arm 32 of the frame to limit the movement of the brake lever 28. The brake lever 28 is provided with a recess 33, the edges 34 and 35 of which frictionally engage the top and bottom of the extension 16, whereby the movement of the extension 16 in either direction is retarded against the thrust of the star wheel 14 and the resilient means previously referred to.

The matrices are released from the magazine 1 by a suitable key-operated mechanism (not shown) and are moved by the belt conveyer 3 and by gravity onto the stick 5 directly in front of the rapidly revolving star wheel 14, the arms of which engage with the matrices and force them against the end block 9, the successive addition of matrices causing the block 9, together with the base 7 and the extension 16, to move toward the left in Fig. 1. The operation of the star wheel is such that the matrices are not tightly packed against the block 9 but engage each other loosely, as indicated in Figs. 1 and 2.

The mechanism just described is that commonly found on type casting machines and it will be readily understood that, while a scale 12 is provided on the front plate 10, owing to the looseness of the matrices on the stick 5 it is impossible to correctly gage from this scale the number of ems of type corresponding to the matrices.

In order that the number of ems carried on the stick may be quickly and accurately gaged I have provided means furnishing a fixed base from which an indicator may be calibrated to show exactly the number of ems assembled on the stick. In a suitable support 36 and secured in any suitable manner to the frame of the machine I mount a clamping member 37 having a tongue 38 adapted to be moved into engagement with the last matrix on the stick and to force all of the matrices against the block 9. The support 36 is provided with a slot 39 through which extends a handle 40 secured to the clamping member 37. A spring 40' connected to the handle 40 normally holds the clamping member 37 in normal retracted position. The tongue 38 moves in an arc about the shaft 15 of the star wheel 14 and the tongue 38 when in the clamping position is in advance of the arms of the star wheel a sufficient distance to take up the looseness of the matrices and to allow the star wheel to revolve without interfering therewith.

On the extension 16 I provide a rack 41 adapted to engage a pinion 42 secured to a shaft suitably mounted in the frame of the machine and a pointer 43 is secured to the shaft by means of a screw 44, or other suitable means, and is adapted to move over a scale 45 on the arc 16. The scale 45 is suitably calibrated to indicate ems of the particular type face which is intended to be used in the machine, the zero of the scale being positioned so that the pointer 43 will rest thereon when the block 9 is disposed against the tongue 38 in clamping position. It will be thus seen that for each matrix disposed between the block 9 and the tongue 38 the pointer 43 will move a corresponding distance on the scale 45 and hence the number of ems may be gaged exactly without removing the matrices from the stick as has heretofore been necessary. To accurately gage the contents of the stick it is merely necessary for the operator to move the tongue 38 to clamping position by means of handle 40.

It is to be understood, of course, that the special form of indicator disclosed may be dispensed with and the scale 12 on the plate 10 may be calibrated with reference to the fixed base provided by the tongue 38 of the clamping member 37 or that any other suitable indicating mechanism calibrated with reference thereto may be substituted.

It is thought that the structure and operation of my device will be clearly understood from the foregoing without further description, it being apparent that I have devised a simple and effective device which may be readily attached to type casting machines and which will allow a much more rapid operation of the machine in setting up certain classes of matter, such as tabulations, where it is necessary to justify the type to properly appear in vertically alined columns.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a device for accurately gaging a line of matrices in a type casting machine, the combination of manually operable means movably mounted adjacent the matrix assembly point and adapted to establish a fixed base or reference datum, and automatically operated indicating means calibrated with reference thereto.

2. In a device of the character described, the combination of a matrix support provided with an end stop, a member mounted adjacent the matrix assembly point and movable to a predetermined position in engagement with the matrices assembled on said support, means for biasing said support in the direction of said member to clamp the matrices between said end stop and member, an indicator calibrated with reference to the predetermined position of said member, and means for automatically actuating said indicator from said support, whereby the distance between said end stop and the predetermined position of said member is registered by said indicator.

3. In a device for accurately gaging a line of matrices on the movable stick of a type casting machine, the combination of manually operable means for establishing a fixed base or reference datum adjacent one end of said stick, an indicator calibrated with reference to said base, and connections between said stick and indicator whereby the movement of said stick is automatically transferred to said indicator.

4. In a device for accurately gaging a line of matrices assembled on the movable stick of a type casting machine, the combination of manually operable means adapted to be moved into engagement with one end of the line of matrices on said stick to establish a fixed base or reference datum, an indicator calibrated with reference to said base, and connections between said stick and indicator whereby the movement of said stick is automatically transferred to said indicator.

5. In a device for accurately gaging a line of matrices assembled on the movable stick of a type casting machine, the combination of manually operable clamping means adapted to be moved into engagement with one end of the line of matrices on said stick to establish a fixed base or reference datum, an indicator calibrated with reference to said base, and connections between said stick and indicator whereby the movement of said stick is automatically transferred to said indicator.

6. In a device for accurately gaging a line of matrices assembled on the movable stick of a type casting machine, the combination of a slidably mounted and manually operable clamping member movable into engagement with one end of the line of matrices on said stick and adapted to establish a fixed base or reference datum, an indicator calibrated with reference to said base, and connections between said stick and indicator whereby the movement of said stick is automatically transferred to said indicator.

7. In a device for accurately gaging a line of matrices assembled on the movable stick of a type casting machine, the combination of a slidably mounted member provided with a tongue, means for moving said tongue into engagement with a line of matrices to establish a predetermined base or reference datum, an indicator calibrated with reference to said base, and connections between said stick and indicator whereby the movement of said stick is automatically transferred to said indicator.

8. In a device of the character described, the combination of a slidably mounted stick provided with an end block, means for establishing a fixed base or reference datum adjacent one end of said stick, an indicator calibrated with reference to said base, and connections between said stick and indicator whereby the distance between said end block and base is automatically registered by said indicator.

9. In a device of the character described, the combination of a slidably mounted stick provided with an end block, means manually movable to a predetermined position for clamping a line of matrices against said end block, an indicator calibrated with reference to the operative face of said clamping means, and connections between said stick and indicator whereby the distance between said end block and the operative face of said clamping means is automatically registered by said indicator.

10. In a device of the character described, the combination of a slidably mounted stick provided with an end block, an arcuate member slidably mounted adjacent one end of said stick and provided with a tongue adapted to be moved into a predetermined position, an indicator calibrated with reference to the operative face of said tongue, and connections between said stick and indicator whereby the distance between said end block and the operative face of said tongue is automatically registered by said indicator.

11. In a device of the character described, the combination of a slidably mounted matrix support, provided with an end block, a member at one end of said support movable into engagement with the matrices on said support and adapted to establish a fixed base or reference datum, means for biasing said support toward said member, whereby the matrices are clamped between said end block and member when the latter is in operative position, an indicator calibrated with reference to said base, and connections between said support and indicator whereby the distance between said end block and said base is automatically registered when said member is in operative position.

12. In a device of the character described, the combination of a horizontally movable matrix support provided with an end block, an arcuate member at one end of said support manually movable into a predetermined and fixed position in engagement with the matrices on said support, means for biasing said support toward said member, whereby the matrices are clamped between said end block and member when the latter is in operative position, an indicator calibrated with reference to said base, including a pivotally mounted pointer, a pinion for rotating said pointer about its pivot, and a rack on said support operatively engaging said pinion, whereby movements of said support are automatically transferred to said pointer.

JAMES W. APPLEGATE.

Witnesses:
WM. O. BELT,
ERNEST H. MERCHANT.

Copies of this patent may be obtained for five cents each, by addressing the "Commissioner of Patents, Washington, D. C."